United States Patent [19]
Hunt

[11] Patent Number: 6,004,088
[45] Date of Patent: Dec. 21, 1999

[54] WALL FASTENER

[76] Inventor: James W. Hunt, 4505 Chase Ave., Bethesda, Md. 20814

[21] Appl. No.: 09/228,489

[22] Filed: Jan. 11, 1999

[51] Int. Cl.[6] .................................................... F16B 21/00
[52] U.S. Cl. .............................. 411/344; 411/21; 411/342
[58] Field of Search .............................. 411/21, 340, 344, 411/345, 342

[56] References Cited

U.S. PATENT DOCUMENTS

| | | |
|---|---|---|
| 499,444 | 6/1893 | Schumann . |
| 638,384 | 12/1899 | Dyer . |
| 1,142,618 | 6/1915 | Pauley . |
| 1,169,635 | 1/1916 | Grimes . |
| 1,210,451 | 1/1917 | France . |
| 1,520,123 | 12/1924 | Gillen ....................................... 411/344 |
| 2,002,818 | 5/1935 | Jones . |
| 2,404,169 | 7/1946 | Gidden . |
| 4,704,057 | 11/1987 | McSherry .............................. 411/344 X |
| 4,764,065 | 8/1988 | Johnson ..................................... 411/21 |
| 5,226,768 | 7/1993 | Speer . |
| 5,331,531 | 7/1994 | Unger et al. . |

*Primary Examiner*—Neill Wilson

[57] ABSTRACT

This invention is a wall fastener to join abutting surfaces such as affixing a bracket to a wall. The L-shape arms of the fastener are attached with hinges to a shell or to a slidable nut enclosed in a shell which is inserted in a preformed hole or aperture in the wall. The fastener with arms attached to the slidable nut is adjustable for use with walls of varying widths. A screw holding the object to be attached is inserted in the shell and threaded through the nut (FIG. 4). The screw then engages the arms of the fastener and forces them to pivot into a clamping position (FIG. 5). The screw is turned until the arms are clamped against the wall (FIG. 6). The fastener with the arms attached to the shell is similar in operation to the adjustable fastener except its use is for walls or surfaces of the same width as the device.

4 Claims, 4 Drawing Sheets

WALL FASTENER

BACKGROUND—FIELD OF INVENTION

This application is for an improved wall fastener that facilitates the process of clamping two adjoining surfaces together, such as to attach brackets or other objects to a hollow wall.

There are various wall fasteners in use. The one commonly used is the "toggle bolt." It employs anchor arms mounted with springs on a bolt or screw. The arms are compressed in a retracted position for insertion in a hole or aperture in a wall. After insertion the arms expand outward and, by turning the screw, the arms are pulled backwards against the wall or surface to which an object is to be attached. The shortcomings of the toggle bolt are that the arms, by expanding outward, cannot begin to open until the retracted arms are well clear of the backside of the wall. This can restrict the use of a toggle bolt when the arms must expand in a cavity formed by the space between two walls or surfaces. The arms cannot expand unless the width of the cavity exceeds the length of the arms. The device is also awkward to install because the bolt has to be grasped and be held firmly with one hand at the same time as it is being turned by the other.

A variation of the toggle bolt is the "molly bolt." Instead of arms the bolt has a shell surrounding it which is supposed to act as an anchor by collapsing against the wall when the bolt is turned. However, because significantly more force is required to collapse the shell than to just turn the bolt, the shell, rather than collapsing, tends to yield to this force as the bolt is turned by rotating ineffectually unless the shell is inserted firmly in material that is rigid enough to hold the shell in place or is held by some mechanical device. In addition, neither a toggle bolt nor a molly bolt can be removed once installed.

BACKGROUND—DESCRIPTION OF RELATED ART

Several concepts have been advanced as alternative wall fasteners. However, each has its shortcomings.

U.S. Pat. No. 499,444 (Schumann, 1893), entitled a "Bolt for Attaching Articles to Walls," describes a fastener with a hollow shell that differs from a toggle or molly bolt by having inward rather than outward expanding anchor arms. The arms are expanded into a clamping position by the insertion of a screw or bolt in the shell. However, it is not adjustable for walls of more than one width.

U.S. Pat. No. 2,404,169 (Gidden, 1946) also describes a fastener with inward pivoting arms. It improves on Schumann's device by being adjustable for use with walls of varying widths. This is accomplished by having slots in the hollow shell along which the two arms of the L-shape anchor slide to adjust to the thickness of the wall. However, like a toggle or molly bolt, it still has to be held when tightened because the arms of the anchor that are to be clamped against the wall are located on the outside of the shell when in the retracted position. The aperture or hole in which the shell is to be inserted must therefore be larger than the diameter of the shell. This prevents the snug fit for the shell that is necessary to hold it in place as the screw is turned.

The part of the anchor arm located inside the shell has a series of straight ridges on its surface which are intended to serve as threads to engage the diagonal threads of the insertion screw as the means to draw the anchor arms backwards into position for clamping. The anchor arms, however, are not connected to each other when in the retracted position to keep them in alignment when the screw or bolt is inserted and are not physically attached to the shell. They are loosely linked to the shell by means of a notch that fits into the shell's slots.

U.S. Pat. No. 5,226,768 (Speer, 1993) is a concept for an "expansible anchor bolt" somewhat similar to Gidden's device with slots in a shell along which L-shape anchors slide. The means by which the loosely fitting anchors are retained in the shell are not clearly disclosed. An insertion screw or bolt advances past the arms until it contacts a separate piece called a "locking collar." The shell is elongated to accommodate the collar which negates the advantage of inward expanding anchors over outward expanding anchors when the size of the cavity space between walls is a factor to consider in the use of a fastener. The bolt is intended to thread itself into the rounded collar but the means by which the collar is held steady without turning to allow the bolt to be engaged is not clearly disclosed. As the screw is tightened, the collar is drawn backwards to fulfill its single purpose of meeting the loosely fitting anchor arms to lock them in place.

As set forth in more detail below, my device is a significant advancement over this prior art by correcting the loose coupling of the anchors and by providing the means by which all the parts become properly engaged to allow the device to function as intended. This is achieved by means of hinges and a multipurpose slidable tightening nut. The looseness in the anchors' linkage is corrected by physically attaching them to the nut with hinges so that the anchors and nut become one complete part rather than separate pieces. This correction also eliminates the need for an elongated shell. In operation the tightening nut first serves as a stabilizer to guide the insertion screw to the anchors. The anchor arms meanwhile hold the nut firmly in place so that it cannot turn while the screw is inserted. The hinges, securely connected by the nut to each other to keep them in proper alignment to prevent jamming, then allow the anchor arms to pivot to an expanded position until locked in place by the screw. The device, by not requiring an elongated shell, restores the advantage of inward expanding over outward expanding anchors in narrow wall cavities.

SUMMARY OF THE INVENTION

The object of my invention is a dependable fastener that can, depending on the intended use, be adjustable or non-adjustable for the width of a wall or other surface. It is quicker and easier to install than other fasteners and is intended for either a professional craftsman or an unskilled do-it-yourselfer. Hinges on the device allow for versatility and can be either mechanical or flexible. Flexible hinges can be made of plastic or other resilient material.

Hinges, either mechanical or flexible, when attached to the slidable tightening nut allow the fastener to adjust to a wall's width. Flexible hinges attached to the shell rather than to the nut provide for a simplified non-adjustable fastener for walls or surfaces of the same width as the length of the fastener.

Hinges further allow the arms of an anchor to lie flush with the side of the shell when in the retracted position for insertion in a wall opening so as to require a hole or aperture no larger than the diameter of the shell. This allows the shell to be held in place by its snug fit in the hole so that the screw can be easily turned with one hand without simultaneously having to hold the screw or shell with the other. This makes the fastener easier than others to install.

The inward expanding anchors allow the retracted arms to begin opening as soon as their tips enter the space on the backside of the wall. This allows the device to be used in a cavity between walls that may be too narrow for a toggle bolt, or a device with an elongated shell, which must be fully inserted before the arms can open. The installation time is also lessened by reducing the turns needed to tighten the screw.

DESCRIPTION OF THE SEVERAL VIEWS OF THE FIGURE DRAWINGS

Figure 4:
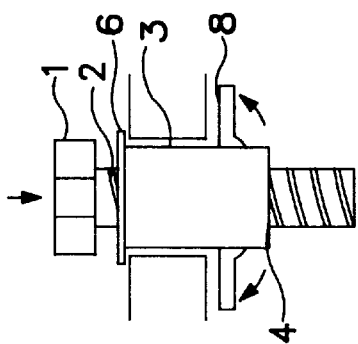
FIG. 4 shows the fastener with the arms fully opened, locked and clamped.

DESCRIPTION OF REFERENCE NUMBERS 1 screw
2 threads
3 shell for adjustable fastener
3a shell for non-adjustable fastener
4 stop
5 slot
6 flange
7 threaded slidably tightening nut
8a anchor "long" arm
8b anchor "short" arm
9 mechanical hinge
10 pivot pin
11 threaded hollow tightening nut
12 flexible hinge
13 pawl

Detailed Description of the Invention

Figure 3:
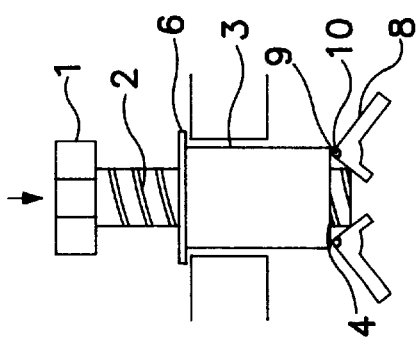
FIG. 3 is a view of the screw starting to spread the anchor arms.
Figure 2:
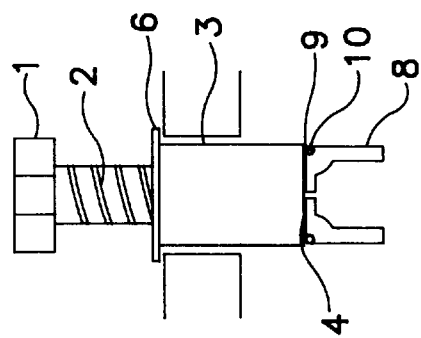
FIG. 2 is a perspective view of the fastener inserted in the wall with the anchors in a retracted position.

My invention has hinged L-shaped anchors (8a and 8b). The hinge (9 and 12) is attached to an anchor at the angle formed by the two arms of the anchor. The perpendicular arm of the L is referred to as the "long" anchor arm (8a); the horizontal arm is referred to as the "short" arm (8b). The hinge may be either mechanical (9) or flexible (12). The mechanical hinge is attached by a pivot pin (10) to a round threaded nut (7) located inside a hollow and round longitudinal shell (3) with slots (5) on opposing sides of the shell. The slots extend along the length of the shell to allow the long arms either to lie even with the sides of the shell or to swing out (FIGS. 2, 3, and 4).

Figure 12:
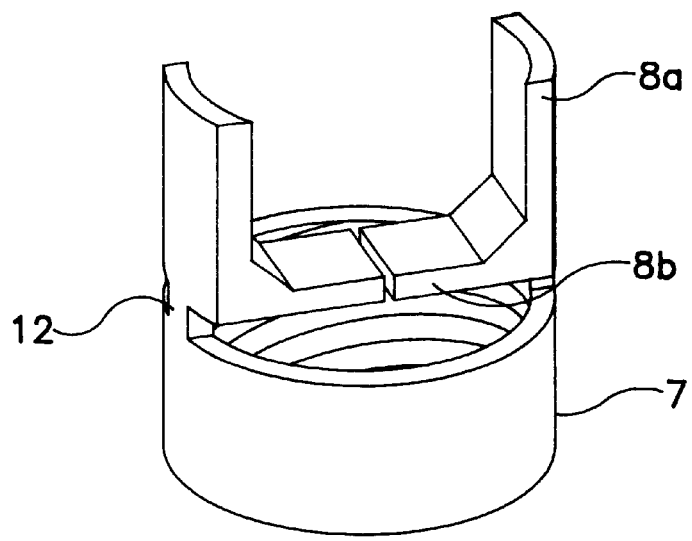
FIG. 12 is a view of an anchor with a flexible hinge attached to the tightening nut.
Figure 13:
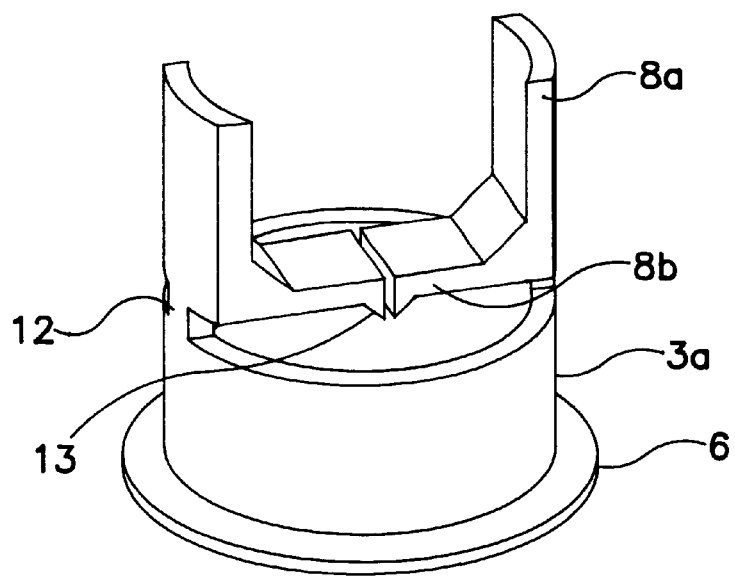
FIG. 13 shows a flexible hinge attached to the shell with a pawl on the "short" anchor arm.

The flexible hinge (12) can be made of plastic or other resilient material. It is attached either to the slidable nut (FIG. 12) or to the shell (FIG. 13). A fastener with the hinge attached to the shell does not have a slidable nut. It can be used with walls or surfaces of the same width as the fastener such as attaching two panels of the same thickness together. The nut and shell may be made of the same material as the flexible hinge so that the hinge may be attached to the nut or shell as part of the molding process when manufactured.

Figure 1:
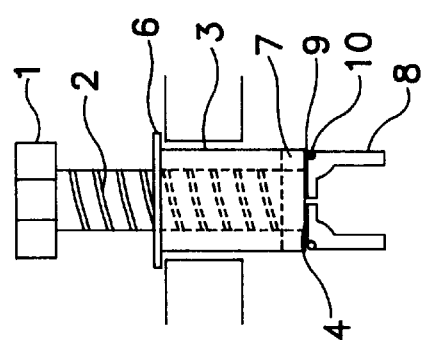
FIG. 1 is a perspective view of an adjustable fastener assembly showing the interior portion of the shell with the rounded tightening nut and attached anchors.
Figure 5:
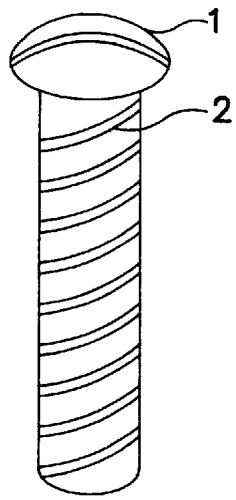
FIG. 5 is an enlarged view of a solid screw with a slitted round head.
Figure 7:
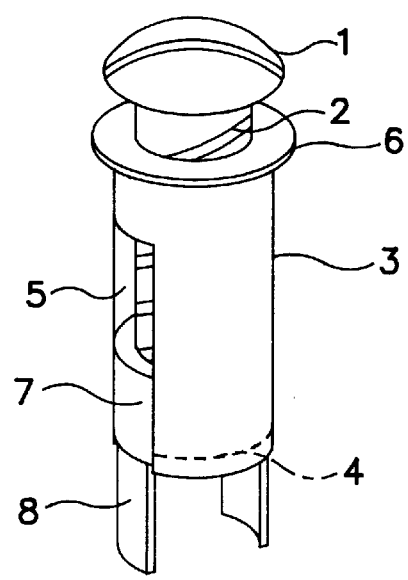
FIG. 7 is a perspective view of an adjustable fastener assembly.
Figure 8:
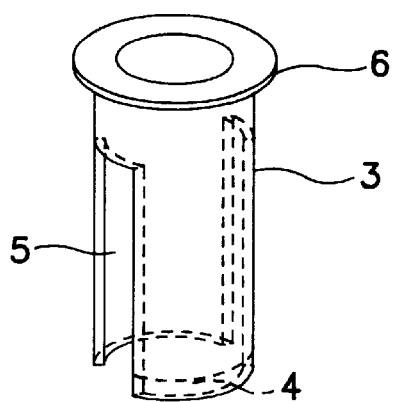
FIG. 8 is a view of the fastener shell.
Figure 9:
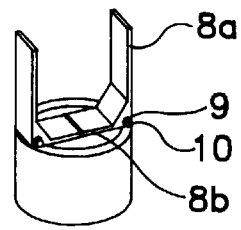
FIG. 9 is a view from the bottom of the rounded tightening nut insert showing the nut, anchors and mechanical hinges.
Figure 10:
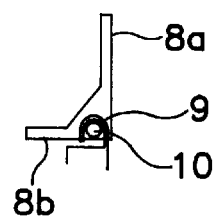
FIG. 10 is a side view of an anchor with a mechanical hinge and pivot pin.

The slots on the shell of an adjustable fastener (5) permit it to be used with walls of varying thickness by allowing the nut and arms to slide along the length of the shell with a stop (4) at one end of, and within, the shell to retain the nut in the shell. The end of the shell opposite the stop has a flange (6) extending out from the shell which serves as a stop when the shell is inserted in the hole or aperture in a wall. This flange end of the shell also has an opening to allow a tightening screw to be inserted into the shell to be threaded into the opening on the nut's interior surface (FIG. 7). The threads on the screw match those in the nut to insure that they mesh. The hinges are attached to the edges of the exterior surface of the nut which is the surface that faces the stop (FIG. 7). When the fastener is to be inserted in, or removed from, a wall or other surface the long arms of the anchors swing down to a closed or retracted position to lay even with and on the same line as the slots of the shell, while the short arms simultaneously pivot downwards to be inside the shell and to lay halfway across the exterior opening in the nut (FIGS. 1 and 2). To place the anchor arms in an open position to clamp them to a wall, the screw is threaded through the nut to engage the short anchor arms lying across the opposing opening in the nut to cause them to swing up and become parallel with the screw, while at the same time the long arms pivot inward to become perpendicular to the shell and screw and parallel to the wall or surface to which the fastener is to be clamped (FIG. 3 and 4).

Figure 14:
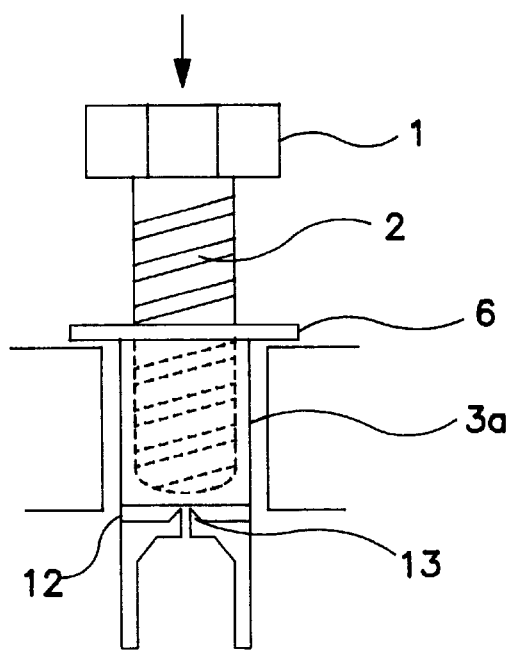
FIG. 14 is a perspective view of the fastener with a flexible hinge attached to the shell inserted in a wall with the arms in a retracted position.
Figure 15:
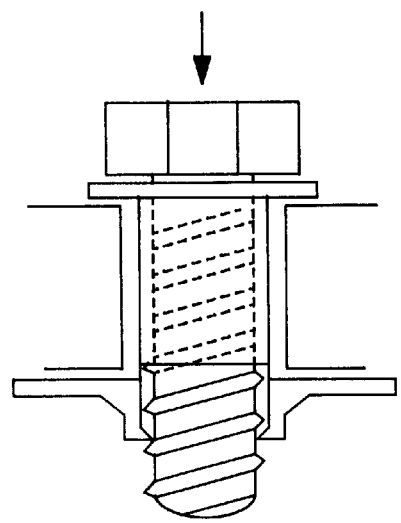
FIG. 15 is another perspective view of the same fastener with the arms expanded and the pawl locked on the insertion screw.

The attachment of a flexible hinge to the shell rather than to a nut provides for a simple installation where the width of the wall is the same as the length of the shell. The operating principal is otherwise the same as described for a mechanical hinge except that after the screw is inserted in the shell to engage and expand the anchor arms, it is held in place by a pawl on the short arms of the anchors (FIG. 14 and FIG. 15). The interior side of the pawl is beveled; the opposing side is perpendicular to the arm (13).

The shell of an adjustable fastener is inserted with the arms in the retracted position in a preformed opening in the wall or surface to which an object is to be attached. The screw, with the object to be clamped attached to it, is inserted into the shell until contacting the tightening nut (FIG. 1 and 2). As the screw is turned it threads itself through the nut. The nut, in turn, is held in place so as not to rotate by the anchor arms lying in the shell's slots. When the screw emerges on the exterior side of the nut it engages the short arms of the anchors lying across the nut's opening which are attached to the nut by hinges. It inserts itself between the arms and pushes them outward thereby causing the long arms of the anchor to concurrently pivot inward to a position perpendicular to the screw and shell (FIG. 3). As the screw continues to be turned it pulls the nut and the attached projecting long arms of the anchors along the shell's slots toward the wall until they press firmly and securely against it thereby clamping the desired object to the wall or surface (FIG. 4). The anchors remain locked in this clamped position as long as the screw remains inserted between the short arms of the anchors. If the fastener needs to be removed, the screw is loosened until the long arms of the anchors are free to pivot to their retracted position when they come into contact with the sides of the wall as the fastener is withdrawn. The fastener can then be removed for reuse.

The operation of the non-adjustable fastener is similar to that of the adjustable fastener. After the shell is placed in the wall, the screw is inserted until it contacts the short arms of the anchor attached to the shell by a hinge (FIG. 14 and FIG. 15). The flexibility of the hinge allows the long arms to then pivot until they are perpendicular to the shell in a clamping position and the screw meets resistance from the pawls on the short anchor arms. Additional pressure by the screw on the pawls compresses the resilient arms enough to allow the screw's threads to slide past the beveled sides of the pawls. When the screw is fully inserted, the resilient anchor arms are returned to their natural position by the compressed energy and push the pawls into the grooves on the screw's threads. The straight sides of the pawls prevent the screw from sliding backwards. It thus becomes locked in place. In short, the resilience of the anchors allows them to work like ratchets to force the pawls to engage the teeth of the screw. By simply applying pressure to the screw the fastener snaps in place. The screw can be removed by turning it in a counterclockwise manner.

An additional advantage of the hinge and shell being made of a resilient material rather than a rigid substance like metal is that, even though the device is not adjustable, it can still be made to accommodate walls or surfaces that are not as wide as the length of the shell. This is achieved by making the angle of the anchor's arms when manufactured greater than a L-shape right angle. The long arms would still lie flush with the shell when in a retracted position, but the short arms would lie pointing inwards in the shell. When the short arms are forced outwards by the screw, the ends of the long arms, being at a greater angle from the short arms, would slant inwards beyond the perpendicular so as to be able to clamp against surfaces that are not as wide as the length of the shell. When the width of the surface is the same as the shell's length, the pressure from the insertion screw would compress the resilient long arms into right angles perpendicular to the shell when they contact the surface.

Figure 6:
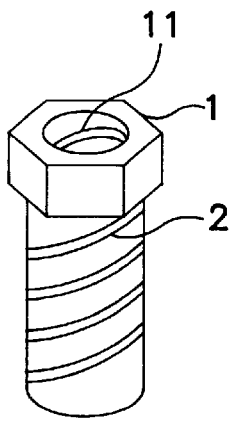
FIG. 6 shows a hollowed screw with a bolt head.
Figure 11:
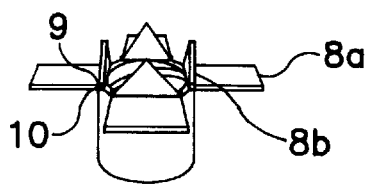
FIG. 11 is another bottom view of the insert showing the tightening nut with four anchors having triangular shaped "short" arms.

Both adjustable and non-adjustable fasteners can have two or more anchors. The short arms of a two-anchor fastener can be either rectangular or triangular in shape while the short arms of a fastener with more than two anchors can be triangular to fit in place over the opening in a nut (FIG. 11). The shell of an adjustable fastener would have slots corresponding with the number of anchors. A larger form of the device can have a hollow screw or bolt to allow a wire or other object to be inserted through it (FIG. 6). A threaded interior allows a threaded pipe to be inserted, such as one used to mount a lighting fixture to a wall or ceiling.

The fastener is thus an improved and versatile device to ease the process of securely attaching objects to walls or other surfaces.

I claim:

1. A device for fastening together two adjoining surfaces comprising (a) a hollow longitudinal shell with slots extending the length of the shell and a threaded nut contained inside the shell which can slide inside the shell and to which nut a pivoting anchor with two arms forming a L-shape right angle is attached, (b) a means of attaching the anchor to the nut by a hinge which permits one arm of the anchor to pivot to lie along the length of the shell in a retracted position, while it also permits the other arm to pivot to lie across the opening in the nut facing a stop at the end of the shell, (c) an opening at the end of the shell opposite the stop permitting the insertion of a bolt or screw which when turned is threaded through the nut to engage the hinged arms of the anchors attached to and lying across the opening in the nut, forcing itself between them, and thereby causing the arms to pivot on the hinge into a position parallel with the screw and in turn causing the retracted arms lying along the length of the shell to pivot through the slots in the shell into a position perpendicular to the screw and parallel to the surface in which the device is inserted and to which surface the arms advance to become clamped and fastened as the screw is turned.

2. A device for fastening together two adjoining surfaces comprising (a) a hollow longitudinal shell to which a pivoting anchor with two arms is attached, (b) a means of attaching the anchor to the shell by a hinge which permits one arm to lie along the length of the shell in a retracted position, while it also permits the other arm to pivot to lie across the opening in the shell, (c) a pawl on the arm lying across the opening in the shell, (d) an opening at the end of the shell opposite the anchor permitting the insertion of a bolt or screw which when it engages the pawls on the arms of the anchor lying across the opening in the shell forces the arms to pivot on the hinge into a position parallel with the screw and in turn causing the retracted arms lying along the length of shell to pivot inward toward the surface in which the device is inserted and to which surface the arms advance to become clamped and fastened as the screw is inserted and engages the pawls.

3. A fastening device as claimed in claims 1 and 2 with hinges made of plastic or other resilient material.

4. A fastening device as claimed in claims 1 and 2 with multiple hinged anchors.

* * * * *